United States Patent
Ehrman et al.

(10) Patent No.: US 6,701,952 B1
(45) Date of Patent: Mar. 9, 2004

(54) VALVE AND METHOD FOR FITTING IT TO A TANK

(75) Inventors: Moshe Ehrman, Halutza (IL); Ehud Orenstein, Halutza (IL); Zohar Moalem, Halutza (IL); Yoav Livne, Halutza (IL); Valdimir Olshanetaky, Beer Sheva (IL)

(73) Assignee: Raval A.C.S. Ltd., Halutza (IL)

(*) Notice: Subject to any disclaimer, the term of this patent is extended or adjusted under 35 U.S.C. 154(b) by 5 days.

(21) Appl. No.: 10/031,605

(22) PCT Filed: Jul. 13, 2000

(86) PCT No.: PCT/IL00/00413

§ 371 (c)(1),
(2), (4) Date: Feb. 25, 2002

(87) PCT Pub. No.: WO01/07806

PCT Pub. Date: Feb. 1, 2001

(30) Foreign Application Priority Data

Jul. 23, 1999 (IL) .................................................. 131051

(51) Int. Cl.[7] .............................................. F16K 24/04
(52) U.S. Cl. ......................... 137/202; 137/43; 137/587
(58) Field of Search .......................... 137/43, 202, 587

(56) References Cited

U.S. PATENT DOCUMENTS

| 4,742,840 A | * | 5/1988 | Takahashi et al. ............. 137/43 |
| 4,989,629 A | | 2/1991 | Shirakawa |
| 5,277,217 A | | 1/1994 | Kobayashi et al. |
| 5,568,823 A | * | 10/1996 | Tateishi ....................... 137/202 |
| 5,577,526 A | * | 11/1996 | Kasugai et al. .............. 137/202 |
| 5,687,753 A | | 11/1997 | Doll |
| 5,738,132 A | * | 4/1998 | Zakai et al. ................... 137/43 |
| 5,782,262 A | * | 7/1998 | Kim .............................. 137/202 |
| 5,954,083 A | * | 9/1999 | Hattori ......................... 137/202 |
| 6,062,250 A | * | 5/2000 | Takahashi .................... 137/202 |

FOREIGN PATENT DOCUMENTS

| EP | 0 724 098 A | | 7/1996 | |
| JP | 4-185534 | * | 7/1992 | ................. 137/202 |

OTHER PUBLICATIONS

Abstract of Japanese Publication No. 4–185534, Published Jul. 2, 1992.

* cited by examiner

*Primary Examiner*—Gerald A. Michalsky
(74) *Attorney, Agent, or Firm*—Birch, Stewart, Kolasch & Birch, LLP

(57) ABSTRACT

A valve (30) fitted within a fluid tank, the valve comprising a housing fitted with one or more fluid inlet ports, and an outlet port. The housing accommodates a float-type valve member (32) axially displaceable within the housing responsive to fluid level within the tank, between an open position in which the outlet port (58) is open, and a closed position in which the outlet port is sealingly closed. The housing is integrally formed with a nozzle member (60) being in flow communication with the outlet port and having a main portion with an outlet thereof extending within the tank.

21 Claims, 7 Drawing Sheets

US 6,701,952 B1

VALVE AND METHOD FOR FITTING IT TO A TANK

This application is the national phase under 35 U.S.C. §371 of PCT International Application No. PCT/IL00/00413 which has an International filing date of Jul. 13, 2000, which designated the United States of America and was published in English.

FIELD OF THE INVENTION

The present invention is generally in the field of fluid tanks and valves for fitting in such tanks. In particular the invention is concerned with connecting a valve to the tank and a suitable tank therefor.

BACKGROUND OF THE INVENTION

A variety of valving means may be fitted for different types of fluid tanks for different requirements. Typical examples are a vehicle's fuel tank, a mobile fluid container, various containers used in different industrial and chemical processes, etc.

It is common practice to connect a valve to a tank by performing an aperture of a size comfortably accommodating the valve's housing, and fixedly attaching the valve by various means, e.g. welding, heat welding, different fasteners, etc. However, this arrangement has several drawbacks. First, it is necessary to provide special sealing means between the valve's housing and the tank. Second, the assembly of each valve is relatively time consuming.

Second, as a consequence of the above arrangements, the external surface of a tank holding such one or more valves also carries at least a portion of an outlet nozzle and tubing connected thereto, as well as, in some cases, also some electrical wiring. This renders accessibility poor and requires special space design and other considerations.

Still another serious problem is concerned in particular with fuel tanks used in vehicles. It is now an ever-growing requirement of environment concerned organizations and authorities that the rate of fuel permeability from the fuel tank and its accessories be minimal. The outcome of this requirement is that new connection means are now required for ensuring essentially permeation-free connection between the valves and the fuel tank.

Still another consideration concerned with connection of valves to tanks is the effective operation level of the valves, namely the level at which the valve closes (at times referred to as cut-off or shut-off and the level at which the valve reopens. One of the considerations governing the operative level is space consuming which is of significant importance [[in]] particular in vehicles. It is thus a requirement that the "dead space" i.e. the space between "maximum fuel level" and the top wall of the fuel tank, be reduced to minimum. However, by inserting the valve into the tank, care has to be taken not to increase the dead space.

It is a first object of the present invention to provide a novel concept for connecting valves to fluid tanks. It is a further object of the invention to provide a tank for accommodating such valves.

SUMMARY OF THE INVENTION

In accordance with a first of its aspects, the invention provides a valve fitted within a fluid tank, the valve comprising a housing fitted with one or more fluid inlet ports, and an outlet port, said housing accommodating a float-type valve member axially displaceable within the housing responsive to fluid level within the tank, between an open position in which the outlet port is open, and a closed position in which the outlet port is sealingly closed;

the valve characterized in that the housing is integrally formed with a nozzle member, said nozzle member being in flow communication with the outlet port and having a main portion with an outlet thereof extending within the tank.

By a preferred embodiment, the entire valve is received within the fluid tank wherein in accordance with a first application, the housing of the valve is formed at an uppermost portion thereof with a stem member for fixedly receiving within a corresponding hole formed at a top wall of the tank. The hole formed in the tank may be a through-going hole or a blind bore.

By a second application, the housing of the valve is formed at a top portion thereof with a first connecting member adapted for engagement with a corresponding, second connecting member integral with a top wall of the tank. Preferably, the first and the second connecting members constitute together a snap-type connection.

In order to minimize the so-called dead space within the tank, a top wall portion of the housing abuts against a bottom surface of the top wall of the tank. Furthermore, in order to decrease the dead space, the housing comprises at least one opening at or adjacent a top end thereof, and one or more openings at a bottom end of the housing.

By a preferred embodiment the inlet openings into the tank are concealed by a wall portion extending from the housing. This arrangement prevents splashing, resulting in unstable positioning of the valve.

Preferably, the valve in accordance with the invention is fitted into a fuel tank of a vehicle, whereby the valve is a fuel valve having one or more of the following functions (all being venting valves): roll-over valve (ROV), and overfilling interdictions valve (OFI), and filling-limit vent-valve (FLVV).

In some cases, where there is a stem member extending from a top surface of the valve through a corresponding aperture formed at a top wall of the tank, said aperture is preferably sealingly covered with a patch member, said patch member being impermeable to fuel vapor. In accordance with such an arrangement, the patch member is attached to an external face of the tank in a non-permeable manner.

By another embodiment of the invention, there may be formed a cavity at a top wall of the tank, said cavity accommodating at least a portion of the valve's housing. The cavity may be an indention formed in the top wall of the tank or, a tubular extension from the top wall with an open end, the open end being sealed with a suitable cover element. According to one arrangement, the housing is formed with a snap-engagement arrangement for snapingly engagement within the corresponding cavity. Preferably, the main portion of the nozzle member extends from, or adjacent, a bottom end of the housing.

Where the top wall of the tank is formed with a cavity, it is preferred that one or more first, bottom inlet port of the housing extend [[at]] or adjacent a bottom surface of the top wall of the tank, and one or more second, top inlet port extend within the cavity, said one or more second inlet port being in flow communication with the interior space of the tank. This arrangement eliminates or reduces to minimum the dead space within the tank.

Wherein the housing is received within a corresponding cavity formed at a top wall of the tank, there is preferably provided a sealing arrangement between the valve and the walls of the cavity.

In accordance with one specific arrangement, the housing is formed at a top end thereof with a laterally extending wall portion adapted for resting over a top surface of a top wall of the tank. In accordance with this arrangement, the housing is formed with an opening sized to accommodate the housing, and where said laterally extending wall portion is larger than said opening.

Still preferably, in accordance with this embodiment, the opening formed at the top wall of the housing is sealingly covered with a patch member, said patch member being impermeable to fuel vapor.

According to a preferred design, the main portion of the nozzle member extends adjacent a bottom surface of a top wall of the tank.

By a preferred design of the valve, the outlet port is a slit-like aperture inclined with respect to a longitudinal axis of the valve and wherein a top surface of the valve member facing said aperture, is substantially equally inclined with respect to the longitudinal axis, and where an elongated flexible closure membrane strip is anchored only at one end thereof to a top surface of the valve member. Suitable means are provided to prevent rotation of the valve member within the housing.

According to a second aspect of the invention, there is provided a fluid tank for fixedly receiving a valve as described herein-above. In accordance with this second aspect, there is provided a fluid tank fitted for receiving at a top wall thereof a valve, said valve comprising a housing fitted with one or more fluid inlet ports and an outlet port, said housing accommodating a float-type valve member displaceable within the housing responsive to fluid level within the tank, between an open position in which the outlet port is open, and a closed position in which the outlet port is sealingly closed;

the tank characterized in that the valve is entirely received within the tank and the valve depends from the top wall.

In accordance with the second aspect of the invention, the fluid tank is fitted at a bottom surface of the top wall thereof, with a connecting member adapted for engagement with a corresponding member formed at an uppermost portion of the housing of the valve.

In accordance with one specific embodiment, the tank is formed at a top wall thereof with a cavity sized to accommodate the valve. Said cavity typically accommodates essentially the entire valve whereby the main nozzle portion extends from or adjacent a bottom end of the housing of the valve. By one embodiment, the cavity is [[a]] tubular-shaped, extending upwardly from a top surface of the tank.

Preferably, the cavity formed in the tank comprises snapping means for engagement with the walls of the valve. Still preferably, the housing is sealingly received within the cavity of the tank.

BRIEF DESCRIPTION OF THE DRAWINGS

In order to better understand the invention and to see how it may be carried out in practice, the invention will now be illustrated, by way of some non-limiting examples only, with reference to the accompanying drawings, in which.

DETAILED DESCRIPTION OF PREFERRED EMBODIMENTS

Figure 1:
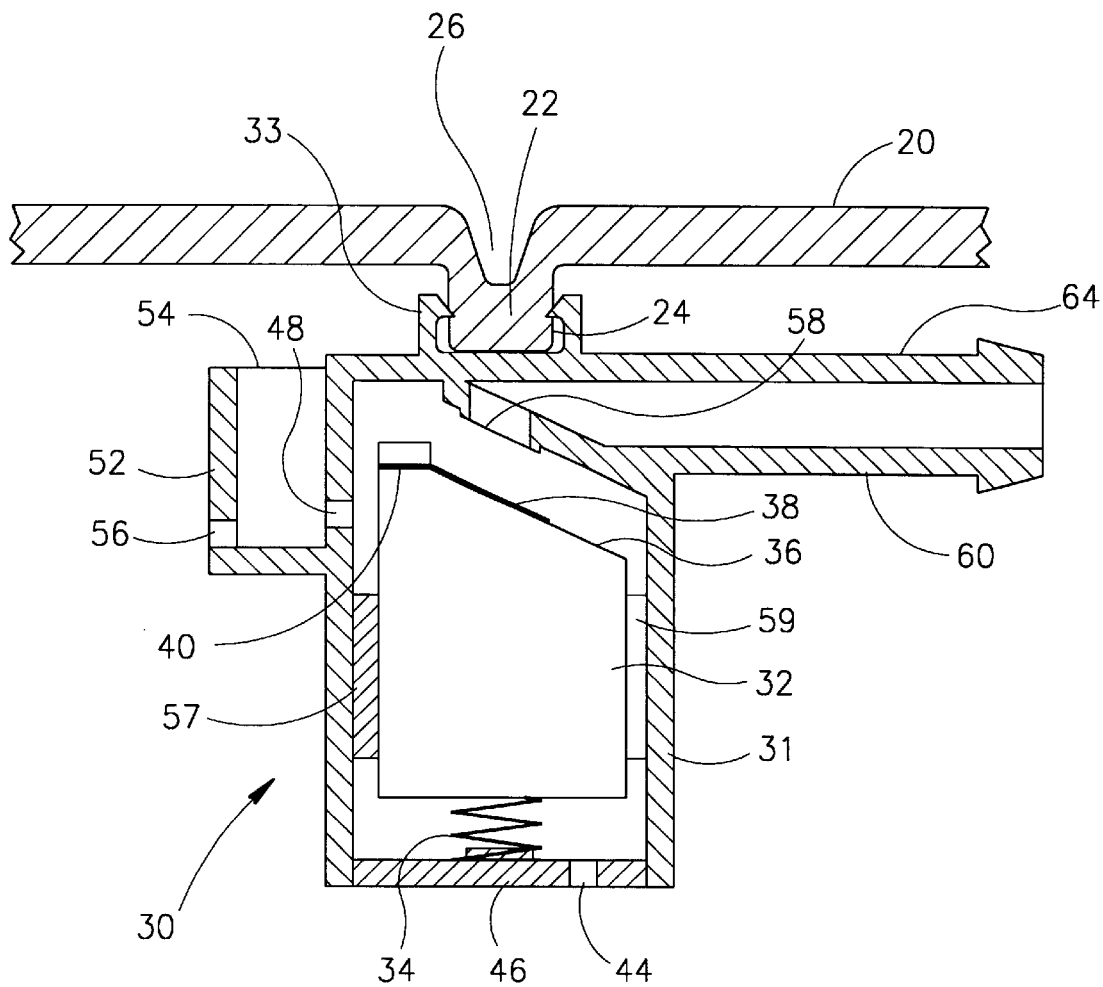
FIG. 1 is a sectional view of a portion of a top wall of a fuel tank, and a fuel valve, illustrating a first embodiment for connecting the valve to the fuel tank.

Attention is first directed to FIG. 1 of the drawings showing a sectioned portion of a top wall 20 of a fuel tank (not shown), integrally formed with a downwardly projecting connecting stem 22 having a lower portion 24. Connecting stem 22 is formed by inwardly depressing [[the]] a vacant portion 26.

A roll-over valve (ROV) generally designated 30 is in itself of known design and comprises a housing 31 and a flow member 32 biased by a spring 34 and formed with an inclined top wall portion 36 fitted with an elongated flexible closure membrane strip 38 anchored at one end 40 thereof [[40]], to a top surface of the float member. The housing 31 has at a top end thereof an annular snap-engagement member 33 for snappingly engaging the stem 22 of the top wall 20. The housing is formed with a first inlet 44 at a bottom wall 46 thereof [[46]] and a second inlet 48 at a top portion of the housing 31, which inlet 48 is concealed by wall portion 52 extending from the housing 31, formed with a top opening 54 and a lateral opening 56, serving to prevent direct splash through inlet[[s]] 48.

Housing 31 is further formed with an outlet port 58 which is a slit-like aperture inclined with respect to a longitudinal axis of the valve, similar to the inclination of wall portion 36. A nozzle member 60 is in flow communication with outlet port 58 and has a main tube portion 64 extending essentially parallel and adjacent to the top wall 20 of the tank.

It should be readily understood that the specific construction of the valving mechanism of valve 30 is of known design, whereby the spring 34 together with buoyancy forces acting on the float member 32 tend to press the membrane strip 38 into sealing engagement with outlet port 58, whilst gravity forces acting on the float member 32 tend to displace the latter away from the outlet port 58 so as to progressively detach the membrane strip 38 from sealing engagement with the outlet port 58.

It is important to ensure that float member 32 is axially aligned within the housing 31 and that it does not rotate there within, thereby ensuring proper sealing of the outlet port 58. For that purpose, the housing 31 and the float member 32 are provided with mating materials 59 and 57.

Whilst a specific valve has been illustrated, it is to be understood that it is rather an intent of the present invention to focus on the connecting means between the valve 30 and the fuel tank wall 20.

Figure 2:
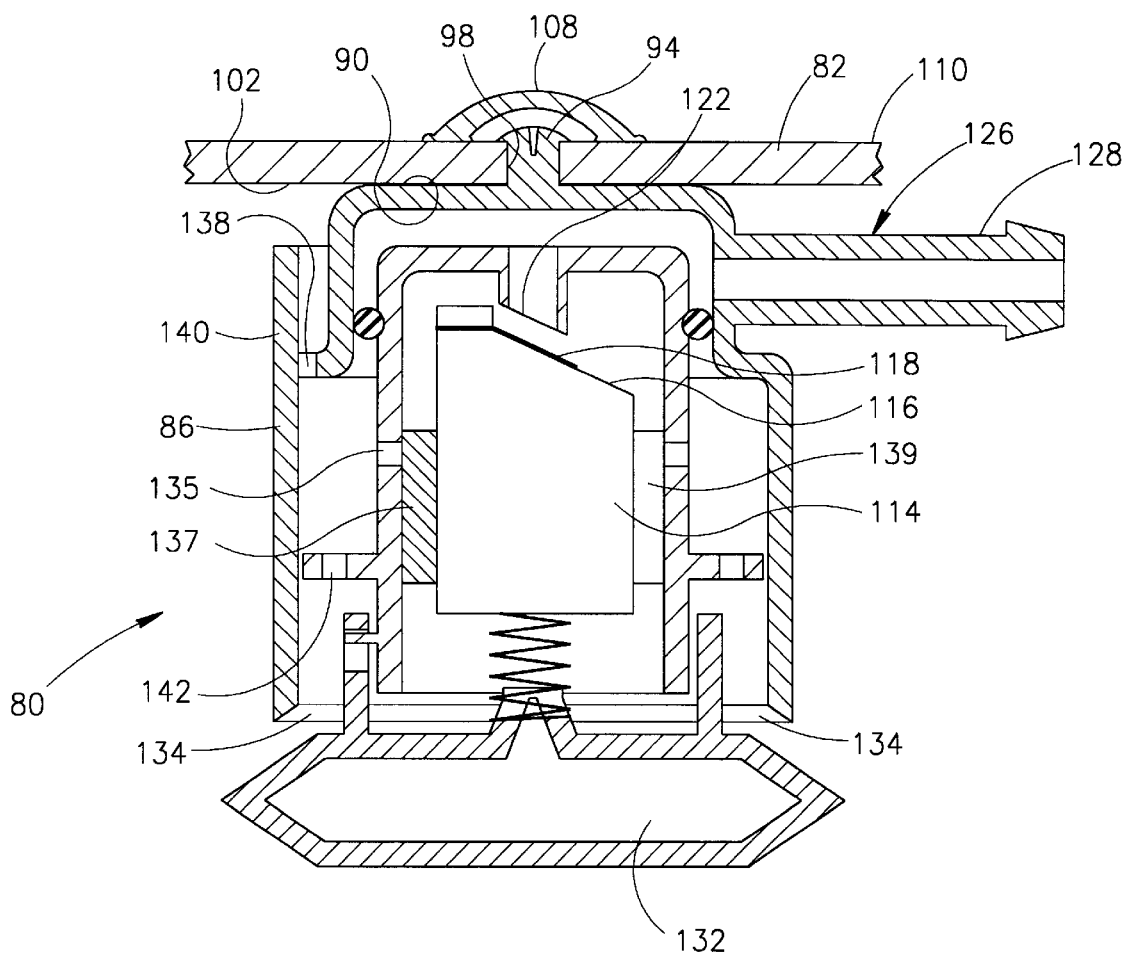
FIG. 2 is a sectional view through a portion of a top wall of a fuel tank and a fuel valve, illustrating a different connecting method in accordance with the present invention.

Further attention is now directed to FIG. 2 illustrating a different embodiment of the invention suitable for connecting a valve generally designated 80 to a top wall 82 of a fuel tank (only a portion of wall 82 is shown). In accordance with this embodiment, a housing 86 of valve 80 comprises at [[a]] top wall 82 thereof [[90]] an upright connecting stem 94 adapted for snap engagement into a corresponding aperture 98 formed in wall 82 whereby top surface 90 of housing 86 comes to tightly bear against a bottom surface 102 of wall 82.

In order to ensure essentially no permeation through aperture 98, a patch member 108 is heat welded over the snap-connection. For that purpose, the patch 108 is preferably made from a multi-layered material having at least one heat weldable layer for welding to the external surface 110 of wall 82. However, it is also an option that the aperture formed in the top wall of the tank is not through-going. In the latter case, there is no need for a sealing patch member. Such a so-called blind bore may be formed in a variety of different ways, as known per-se.

The valving mechanism of valve 80 is essentially similar to that of valve 30 in FIG. 1, whereby a float member 114 is formed with an inclined top wall 116 fitted with a flexible closure membrane strip 118 adapted for sealing engagement with slit-like aperture 122 correspondingly inclined as wall portion 116 correspondingly inclined as wall portion 116. Furthermore, nozzle member 126 is in flow communication with the aperture 122 and its main portion 128 extends adjacent to the bottom surface 102 of wall 82.

It is noted that valve 80 is fitted with a secondary float member 132 fitted to allow evacuation of large quantities of air, e.g. during fuel filling, whereby the significant amounts of air escape through inlet opening[[s]] 134. However, as soon as fuel engages with the secondary float 132 the opening 134 closes (owing to buoyancy forces) whereby further evacuation of air is then possible through an inlet port 138 at a top portion of the housing 86 and then through openings 135 formed at an inner wall member of the valve 80. It is further noticed that the inlet port 138 is concealed by wall portion 140, preventing splashing of fuel into opening 135. Nevertheless, fuel entering through inlet 138 may then escape through opening 142 and then through opening 134, back into the tank.

Similar to the arrangement of FIG. 1, means are provided for ensuring that the float member 114 is axially aligned within the housing 86 and that it does not rotate there within, thereby ensuring proper sealing of the outlet 122. For that purpose, the housing 86 and the float member 114 are provided with mating materials 139 and 137.

Whilst reference is being made to a specific design of float member 80, it is to be understood that it is the intention of the invention to focus on connecting means between the valve member and the fuel tank.

Figure 3:
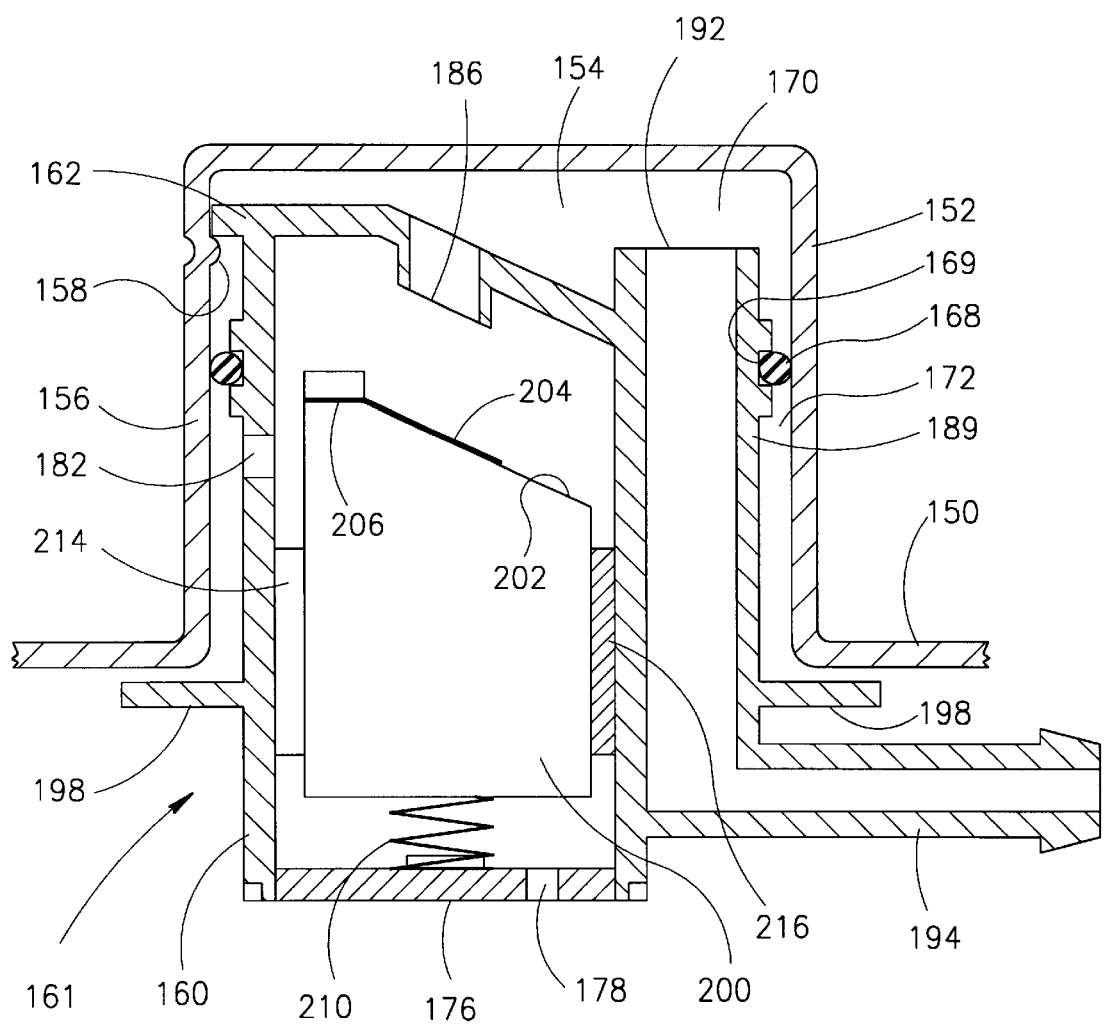
FIG. 3 is a sectional view through a portion of a top wall of a fuel tank and a fuel valve received within a cavity formed in the fuel tank.

In the embodiment of FIG. 3, the top wall portion 150 of a fuel tank (not shown) is formed with an upwardly extending, tube-like, closed deformation 152 defining a cavity 154. A side wall 156 of the deformation is formed with an inwardly projecting rim portion 158 adapted for arresting housing 160 of valve 161 by way of engagement with a laterally projecting shoulder 162, extending at an uppermost end of the housing 160.

Housing 160 is sealingly received within the cavity 154, sealing being obtained by an O-ring 168 received within a suitable annular groove, thereby defining a top chamber 170 and a bottom, lower chamber 172.

Housing 160 is formed at a bottom wall 176 thereof with a first inlet port 178 and at a side wall thereof with another inlet port 182.

The housing 160 is further formed with a substantially elongated slit-like outlet port 186 inclined with respect to a longitudinal axis of the valve. A nozzle member 189 has an open end 192, being in flow communication with the outlet port 186 and has a main portion 194 extending adjacent top wall 150 of the tank.

As can further be seen in FIG. 3, housing 160 is formed with splash-preventing skirt 198, for preventing direct fuel splash into inlet port 182.

Received within housing 160 there is a float member 200, fitted at a top surface thereof 202 with an elongated, strip-like, flexible membrane 204, anchored at one end thereof 206 to the top surface 202, which top surface 202 is offset with respect to the longitudinal axis of the housing similar as the outlet opening 186.

Float member 200 is upwardly biased by means of spring 210 bearing at one end thereof against the float member 200 and at an opposed end thereof against the base wall 176 of housing 160.

It is important to ensure that float member 200 is axially aligned within the housing 160 and that it does not rotate there within, thereby ensuring proper sealing of the outlet 186. For that purpose, the housing 160 and the float member 200 are provided with mating materials 216 and 214.

The arrangement provided in accordance with the embodiment illustrated in FIG. 3 provides the significant advantage that on the one hand, the top wall 150 of the fuel tank is not perforated and, on the other hand, the valve fitted within the cavity 154 functions up to the very end of the tank, namely leaving a small dead space, whereby practically the entire volume of the tank may be used for fuel. This arrangement is particularly useful in tanks made of metal sheet, although, not restricted thereto.

It will be appreciated that rather then performing a plurality of apertures in the top wall of the tank, for receiving valves and their tubing, all the nozzles and piping may extend out of the tank through a common opening. This opening may be large enough to facilitate assembly of the valves within the tank.

The arrangement of the valve in accordance with the embodiment of FIG. 3, is principally similar to that illustrated in connection with FIG. 1 and the artisan is directed to the disclosure of that embodiment.

Figure 4:
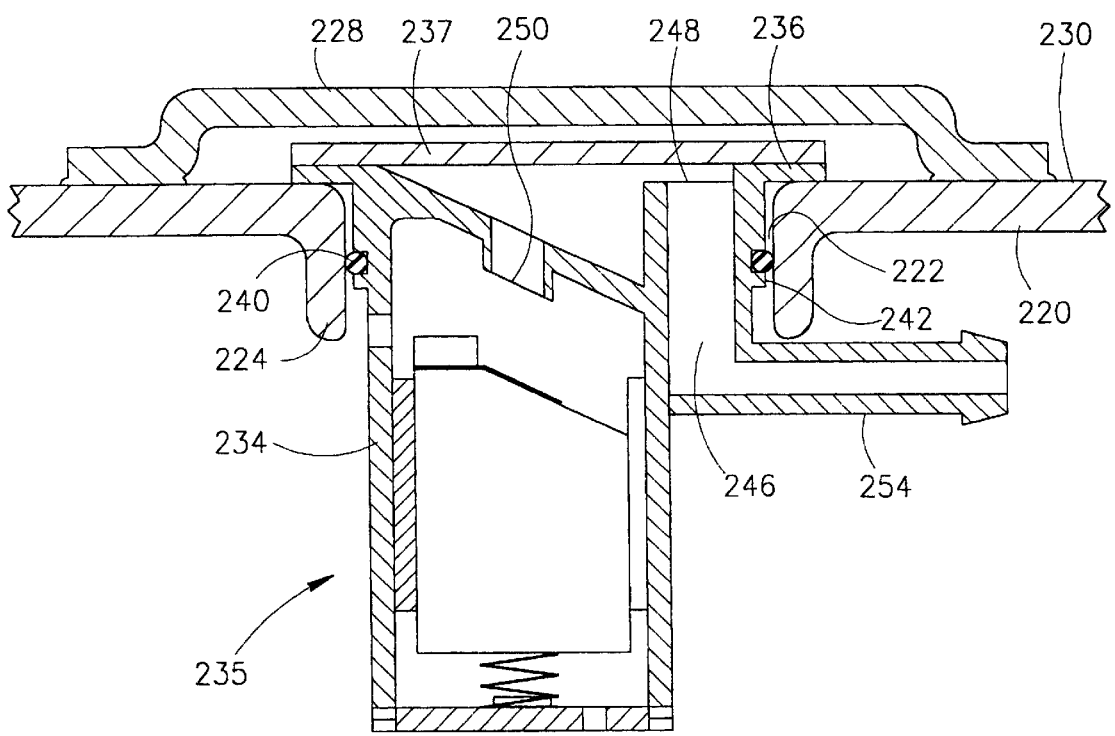
FIGS. 4 to 7 are sectional views through a portion in a top wall of a fuel tank and a fuel valve, illustrating further embodiments for connecting a valve to a tank.

In the embodiment of FIG. 4, the top wall portion 220 of a fuel tank (not shown) is formed with an opening 222 fitted with a downwardly extending annular skirt portion 224. The opening 222 is sealed by a patch member 228 which is sealingly attached, e.g. by head welding, etc., to the opt surface 230 of wall 220. The patch member 228 is impermeable to fuel vapor, as discussed before.

Housing 234 of valve 325 is essentially similar to that illustrated in connection with FIG. 3 and is formed at a top end thereof with a flanging wall portion 236 for bearing over surface 230 of wall 220. An O-ring 240 is received within an annular groove 242 formed in housing 234 and sealingly supports the housing within the skirt 224 of wall 220.

The valve is further formed with a nozzle member 246 having an open end 248 thereof being in flow communication with outlet port 250 of the housing, and has a main nozzle.

It will be appreciated that assembling the valve to the tank is performed by inserting the housing 234 from above, prior to attaching the patch member 228. However, by suitable design it is also possible to assemble the valve from inside the tank.

The structure and principle of operation of the valve of FIG. 4 are similar to those described in connection with FIGS. 1 and 3.

Figure 5:
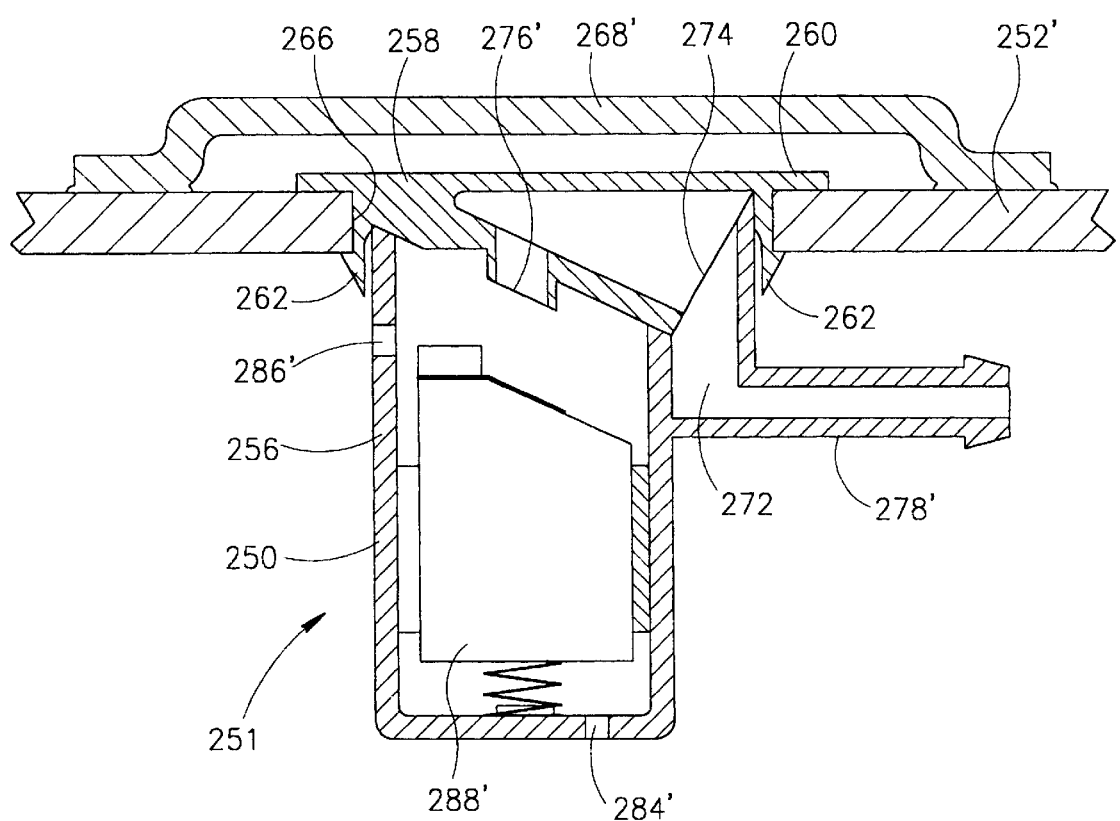

In the embodiment of FIG. 5, principally similar to that of FIG. 4, the difference residing in the method of attaching the housing 250 of valve member 251 to wall 252' of the fuel tank (not shown).

However, in the present embodiment, housing 250 comprises a main portion 256 and a top portion 258 sealingly attached thereto, e.g. by welding or heat welding. Portion 258 is formed with an upper bearing wall portion 260 and resilient snapping prongs 262 for snapping engagement over opening 266 formed in wall 252'. Opening 266 is impermeably sealed by patch member 268, as explained herein before.

Housing 250 is integrally formed with a nozzle member 272 having an open end 274 being in flow communication with an outlet port 276' of the housing. Nozzle member 272 has a main portion 278' extending away from the housing. Housing 250 is formed with inlet ports 284' and 286' and comprises a float member 288' axially displaceable there within for sealing engagement with outlet 276' as explained in connection with the previous embodiments and the reader is referred thereto.

Figure 6:
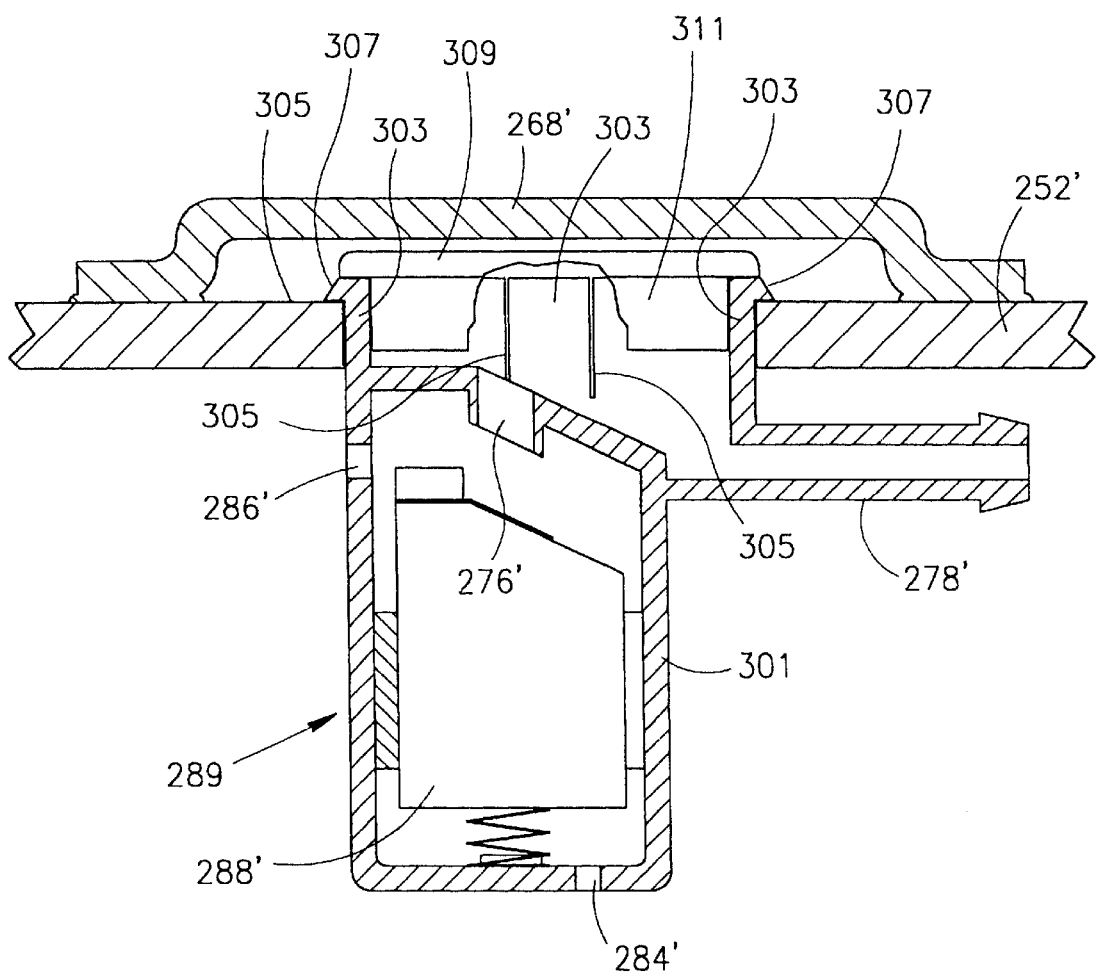

In the embodiment of FIG. 6 the valve 289 has a housing 301 which is principally similar to that illustrated and explained with reference to FIG. 5 of the drawings and accordingly like elements were given like reference numbers with a prime (') indication. The main difference between the present embodiment and that of FIG. 5 resides in the attaching mechanism of the valve 289 to the top wall 252' of the tank.

At a top portion of the housing 289 there are formed four resilient snap-engaging prongs 303 (only three seen). The prongs 303 are integrally formed with the housing and their resilience is obtained by slits 305 formed at side walls of the housing 301. A top face 307 of the prongs 303 is inclined so as to facilitate easy snap-engagement over a top surface 305 of wall 252'. A disc-like top cover 309 has a skirt like portion 311 (partially cut-out) sealingly received within a top opening formed at housing 301, the cover 309 serving both to seal the top of the housing and to prevent the prongs 303 from spontaneously disengaging from the wall 252'.

Other components of the valve 289 are similar to those of the embodiment of FIG. 5, and so is their function. It is noted that the housing is formed with a nozzle 278' being in flow communication with an outlet port 276' and with a first, bottom inlet port 284', and a second, top inlet port 286'. A float member 288' is displaceable within the housing and a cover 268' impermeably seals the opening formed in wall 252'.

Figure 7:
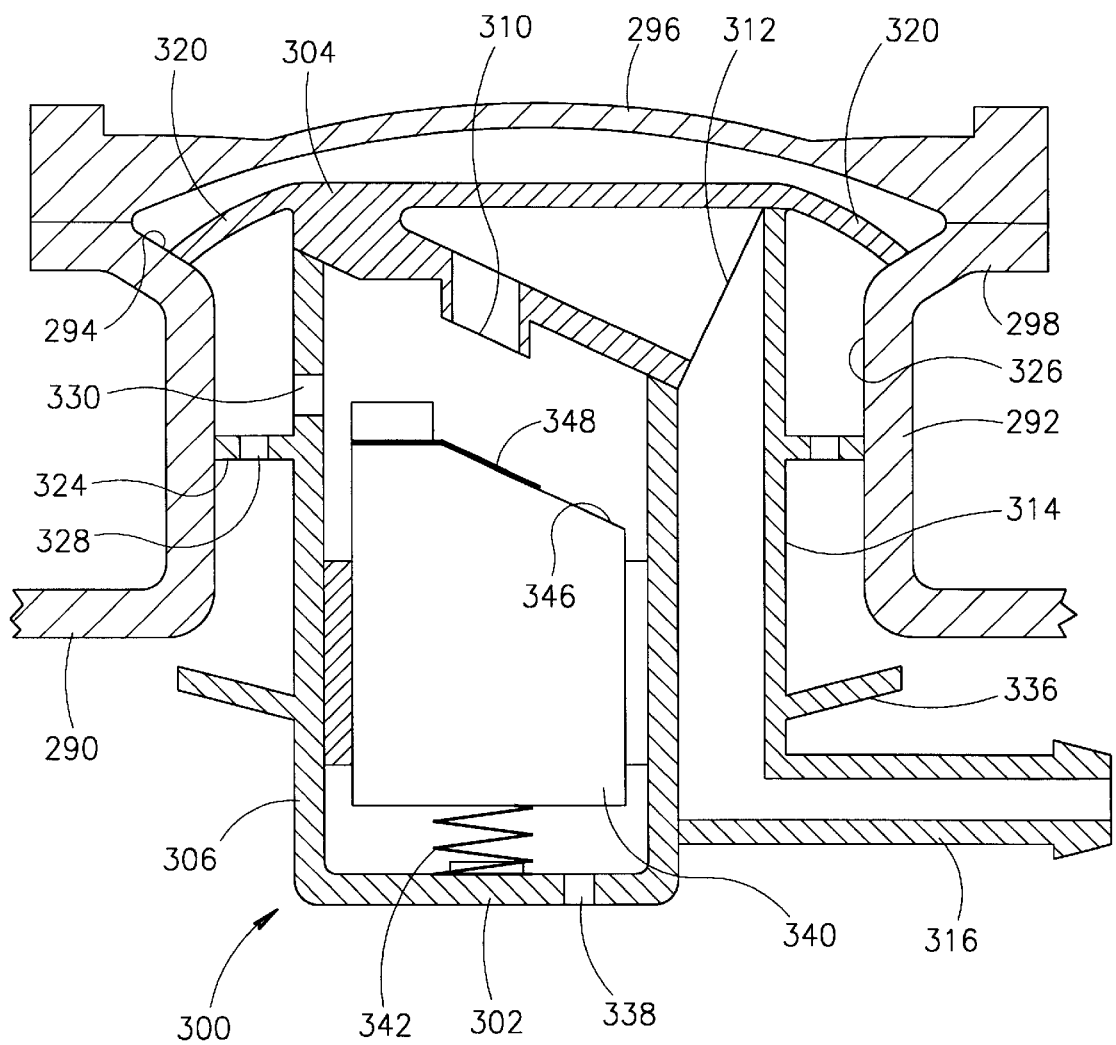

In still another embodiment, illustrated in FIG. 7 of the drawings, there is illustrated a top wall 290 of a fuel tank (not shown), the top wall formed with a tubular extension 292 terminating at an inclined seat portion 294. Tubular portion 292 is sealed by a patch member 296 which, typically, is heat welded over an extension 298 of portion 292 and is impermeable to fuel vapor.

Valve member 300 comprises a housing 302 having a top portion 304 sealingly attached, e.g. by welding, to a housing portion 306 of housing 302, the top portion 304 being formed with an inclined, slit-like, outlet port 310 being in flow communication with an inlet 312 of nozzle member 314 having a main portion 316 extending adjacent wall portion 290.

Top portion 304 of housing 302 comprises firm but resilient lateral extensions 320 supported over inclined portion 294 of the fuel tank. Valve 300 is also supported within the tubular extension 292 by means of annular wall 324 bearing against inner surface 326 of tubular extension 292. Annular wall 324 is formed with flow passages 328 communicating with an inlet port 330 formed in housing portion 306. An annular, laterally extending skirt 336 prevents fuel splashing toward inlet 330. A second inlet 338 is provided at a bottom wall of housing portion 302. This arrangement[[s]] is suitable for assembling the valve member from inside the tank.

A float member 340 is axially displaceable within the housing 302 and is spring biased by spring 342. A top surface 346 of float member 340 is fitted with a strip-like membrane 348 for sealing engagement with outlet port 310.

The operation of the valve is similar to that explained in connection with previous embodiments.

It will be readily understood by the artisan that in particular the embodiments of FIGS. 3 and 7 are suitable for decreasing to a minimum of the dead space at the top of the tank, whereby shut-off occurs when fuel level has reached essentially the top of the tank, eliminating, or reducing to a minimum, dead space. This is achieved by receiving the valve within the cavity upwardly formed at the top wall of the tank, wherein the bottom one or more inlet ports of the valve's housing are essentially equi-leveled with a bottom surface of the top wall of the tank, with a top inlet port of the housing extending within the cavity and being in flow communication with the top space of the tank.

Whilst preferred embodiments have been shown and described, it is to be understood that it is not intended thereby to limit the disclosure, but rather it is intended to cover all modifications and arrangements falling within the spirit and the scope of the invention, as defined in the appended claims, mutatis mutandis.

For example, valve may differ in design and function. Furthermore, the functional level namely, the level at which fuel filling cut-off occurs and the maximum filling level, may differ. Even more so, the outlet nozzle may extend flush with the top wall of the fuel tank or, at different configurations thereof.

What is claimed is:

1. A valve fitted within a fluid tank, the valve comprising a housing fitted with one or more fluid inlet ports, and an outlet port, said housing accommodating a float-type valve member axially aligned within the housing, and is displaceable therealong between an open position in which the outlet port is open, and a closed position in which the outlet port is sealingly closed;

the valve characterized in that the housing is integrally formed with a nozzle member, said nozzle member being in flow communication with the outlet port and having a main portion with an outlet thereof extending within the tank;

said outlet port being formed in an upper portion of the housing, said upper portion having an upper end wall and said outlet port being defined by an aperture within the upper end wall said aperture being sloped with respect to the longitudinal axis of the valve, a top wall portion of the float-type valve member facing said aperture and being equally sloped with respect to the longitudinal axis of the valve, said top wall portion of the valve member being provided with a closure membrane strip that is capable to sealingly engage the aperture within the upper end wall and to fully close the valve when the top wall portion of the float-type valve member approaches said outlet port.

2. A valve according to claim 1, wherein the entire valve is received within the fluid tank.

3. A valve according to claim 2, wherein the housing of the valve is formed at an uppermost portion thereof with a stem member, said stem member is fixedly receivable within a corresponding aperture formed at a top wall of the fluid tank.

4. A valve according to claim 3, wherein a top wall portion of the housing abuts against a bottom surface of the top wall.

5. A valve according to claim 3, wherein the aperture formed at the top wall of the fluid tank is sealingly covered with a patch member, said patch member being impermeable to fuel vapor.

6. A valve according to claim 2, wherein the housing of the valve is formed at a top portion thereof with a first connecting member adapted for engagement with a corresponding second connecting member formed integrally with a top wall of the fluid tank.

7. A valve according to claim 6, wherein the first and the second connecting member constitute together a snap-type connection.

8. A valve according to claim 6, wherein the second connecting member is integrally formed and downwardly extends from a top wall of the fluid tank.

9. A valve according to claim 1, wherein the valve depends at a bottom surface of a top wall of the fluid tank.

10. A valve according to claim 1, wherein the housing comprises at least one opening at or adjacent a top end thereof and one or more openings at a bottom wall of the housing.

11. A valve according to claim 10, wherein the at least one opening is concealed by a wall portion extending from the housing.

12. A valve according to claim 10, wherein there is provided a second float member fitted for closing the one more inlet opening at the bottom of the housing whilst the at least one inlet opening at the top of the housing remains open, allowing filling the fluid tank up to the level of the at least one opening at the top of the fluid tank.

13. A valve according to claim 1, wherein the valve is a venting valve having one or more of the following functions: roll-over valve (ROV), and over-filling interdictions valve (OFI) and filling-limit vent-valve (FLVV).

14. A valve according to claim 1, wherein, the housing is formed with a shoulder for snappingly engagement within a corresponding rim portion of a cavity formed at a top wall of the fluid tank.

15. A valve according to claim 14, wherein the main portion of the nozzle member extends from, or adjacent, a bottom wall of the housing.

16. A valve according to claim 14, wherein the housing is sealingly received within the cavity formed in the fluid tank.

17. A valve according to claim 14, wherein one or more first, bottom inlet port of the housing extends at or adjacent a bottom surface of the top wall of the fluid tank, and one or more second, top inlet port extends within the cavity, said one or more second inlet port being in flow communication with the interior space of the fluid tank.

18. A valve according to claim 1, wherein the housing is formed at a top end thereof with a laterally extending wall portion adapted for resting over a top surface of a top wall of the fluid tank.

19. A valve according to claim 18, wherein the opening aperture formed at the top wall of the housing is sealingly covered with a patch member, said patch member being impermeable to fuel vapor.

20. A valve according to claim 1, wherein the main portion of the nozzle member extends adjacent a bottom surface of top wall of the fluid tank.

21. A valve according to claim 1, wherein the outlet port is configured as a slit-like aperture sloped with respect to the longitudinal axis of the valve, said aperture is made immediate in the upper end wall of the housing.

* * * * *